Patented May 1, 1951

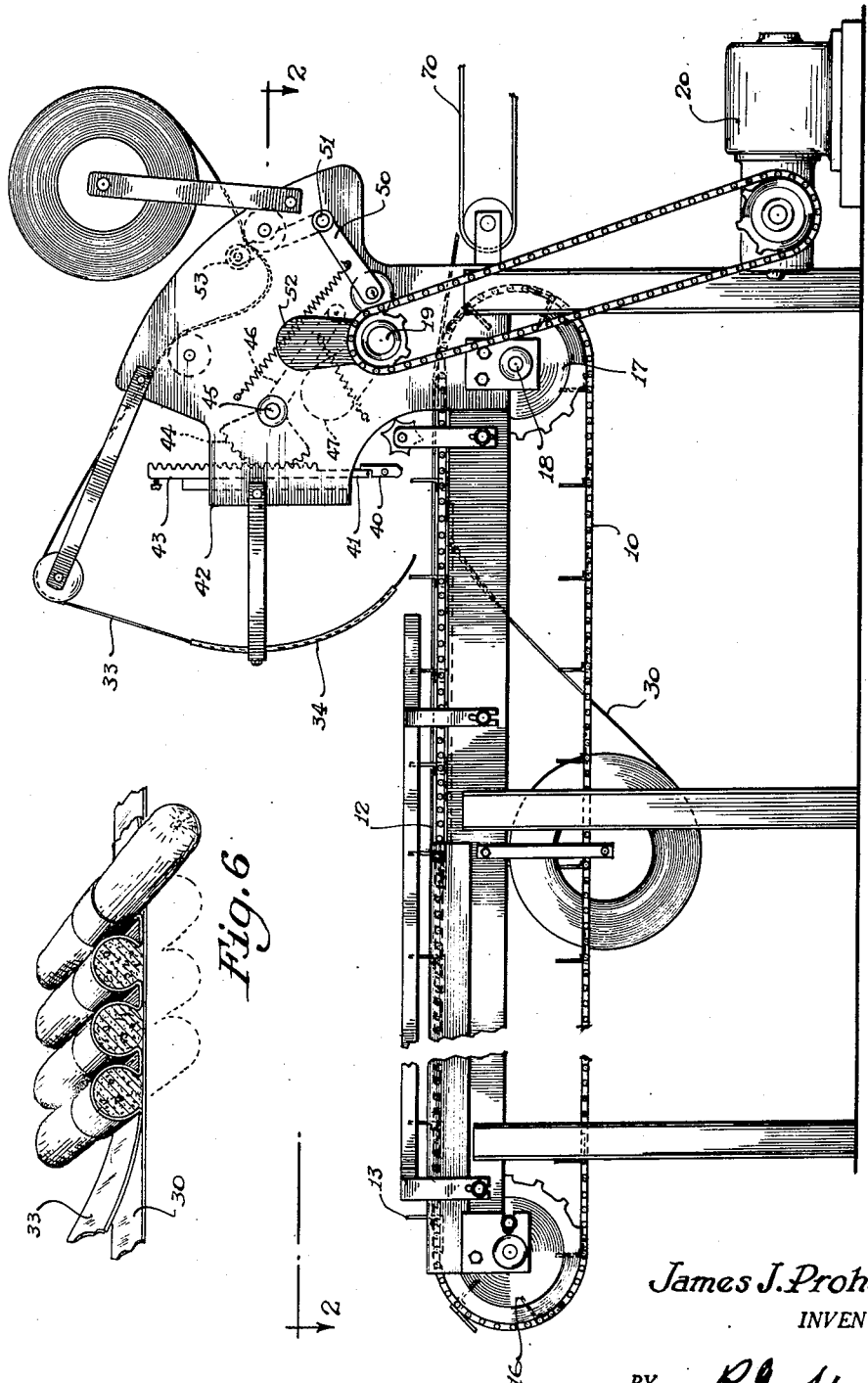

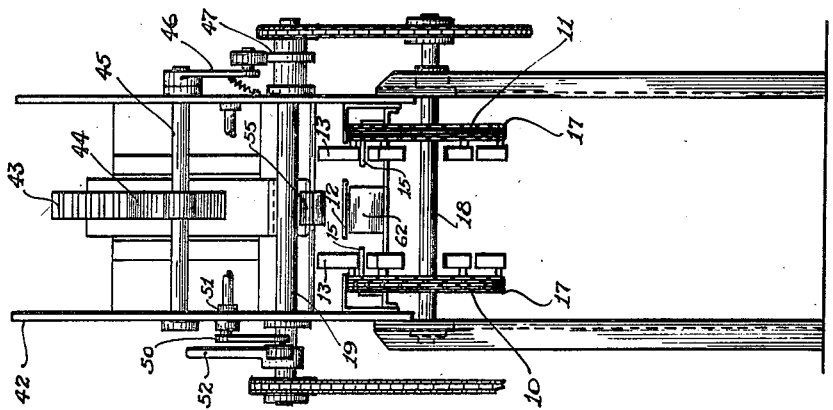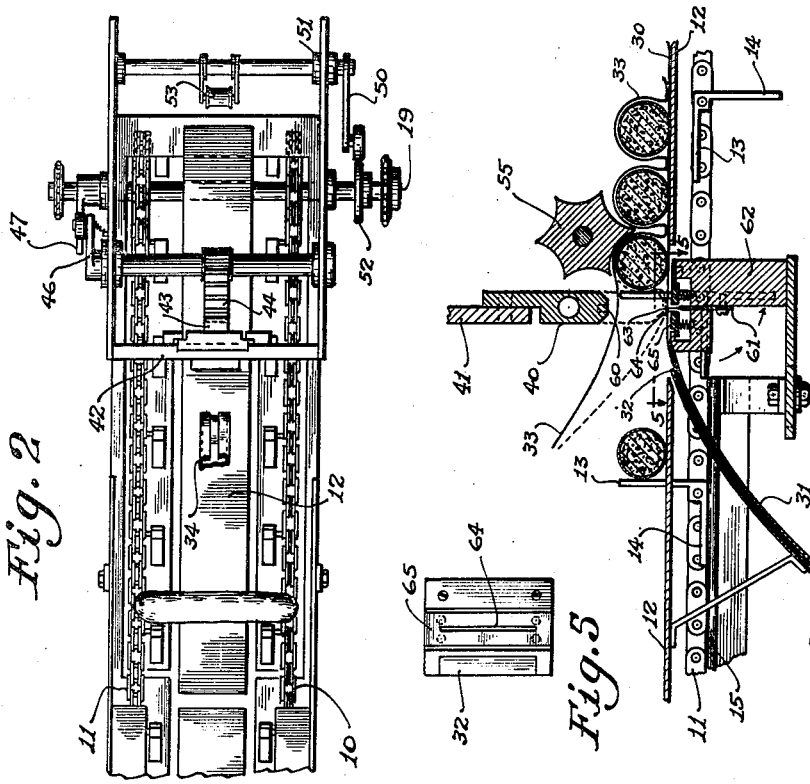

2,551,288

UNITED STATES PATENT OFFICE 2,551,288

BANDING MACHINE AND METHOD

James J. Prohaska, Palos Park, Ill., assignor to Swift & Company, Chicago, Ill., a corporation of Illinois Application December 11, 1944, Serial No. 567,750

2 Claims. (Cl. 93—3)

This invention relates to a banding and packaging machine and more particularly to a banding and packaging machine for sausage products such as frankfurters and the like.

It is an object of this invention to provide a machine for rapidly banding frankfurters and the like.

It is another object of this invention to provide a machine for rapidly incorporating sausage products in bands forming a package.

It is another object of this invention to provide a machine for rapidly banding and packaging sausagelike products in a paper strip having a heat sealing adhesive coated thereon.

It is a further object of this invention to provide a machine for rapidly incorporating frankfurters and the like in a packaging device formed of paper bands while simultaneously perforating said packaging strips so that the individual products may be easily separated from the composite group forming the package.

In the drawings:

Figure 1 represents a side view partly broken away of the machine forming the subject of this invention, Figure 2 is a view of the machine taken on line 2—2 of Figure 1, Figure 3 is an end elevation of the machine shown in Figure 1, Figure 4 is a detailed view showing the working station of the machine, Figure 5 is a plan view of the throat of the machine at the working station taken on line 5—5 of Figure 4, and Figure 6 is a perspective view of the package as formed in the machine of this invention.

In recent years food laws and regulations have been promulgated requiring the labeling of products with ingredient phrases and other information and to comply with the law it has been necessary whenever possible to band sausage products and the like with printed paper bands. Usually, a certain number of the banded products have been placed in each pound of sausage for banding purposes and also to inform the purchaser of the ingredients.

The present invention is concerned with a machine for applying paper bands to sausage products and the like so that the individual sausage items will be properly labeled and, incidentally, the banding means is made to serve as a packaging device. The band is formed around the sausage products by placing the product between two paper strips and then joining the strips together between each of the sausages. With this manner of packaging frankfurters and other sausage products, the generally cylindrical product is relatively tightly engaged between the two strips of paper printed with the necessary ingredient phrases and trade-mark. The machine described herein is particularly adapted for rapidly forming such a banding strip and package for sausage products and the like.

This machine is designed to feed sausages into position to lay across the two strips of banding material generally at right angles thereto while the strips are being simultaneously fed into position and after the individual sausages are laid between them, the banding strips are sealed together. The machine has conveying means incorporated therewith to feed the sausages such as frankfurters into position, and a sealing means cooperates with the movement of the conveying means to join the strips as each frankfurter is fed into a desired position.

Referring more particularly to the drawings, the preferred form of the machine of this invention and after the individual sausages are laid 10 and 11 are disposed to deliver sausages and the like into position under the strip sealing means as best shown in Figures 1 and 2. The endless belts 10 and 11 cooperate with a table 12 so that lugs 13 carried on the inner sides of the conveyors 10 and 11, will engage behind the individual sausages laid on the table 12 which acts as a drag surface to position curved sausages, each with the same orientation. The lugs 13 are fixed to arms 14 to form a general L shape and are pivotally mounted on the conveyors 10 and 11. Each lug is spring loaded so that it normally occupies the position shown at the right hand side of Figure 4 and the lug 13 is turned from this position when the leg 14 engages the cam surface 15 disposed along the underside of the path the lugs follow when moving across the top flight of the conveyors 10 and 11. With this construction it is seen that the lugs 13 are projected above the surface of table 12 as long as the leg 14 rides on the cam surface 15 and since pairs of lugs 13 are disposed on conveyors 10 and 11 opposite each other, a sausage product or the like may be engaged in front of a pair of lugs 13 and dragged forwardly along table 12 by conveyors 10 and 11 as these continuously driven conveyors move in the direction of the arrows as shown in Figure 1.

The conveyors 10 and 11 may be mounted on any suitable means and as shown in the drawings the conveyors preferably take the form of sprocket chains carried on sprocket wheels 16 and 17. The wheels 17 are both carried on a shaft 18 which in turn is driven through a sprocket chain from shaft 19 that is driven from motor 20 as is best shown in Figures 1 and 3.

The lugs 13 are operative to carry the sausage product such as frankfurters into position under an affixing means for joining the strip material together and as soon as the frankfurter is driven to this position, the cam track 15 releases the leg 14, see Figure 4, so that the leg 14 is resiliently urged to move from the full line to the dotted line position. When the leg 14 runs off of cam track 15, lug 13 is moved from its upright position to the position shown at the right hand side of Figure 4 so that further feeding of the frankfurter or the like is discontinued. The feeding movement of the sausage is stopped so that the rear side of the product is disposed to be substantially tangent to the side of the affixing means when it is driven downwardly to join the strip banding material.

Supply means for the banding strip are disposed to deliver banding material into position at the working station of the machine and as shown in Figure 1, a strip 30 is taken from a suitable supply to be delivered through the guide 31 to the throat 32 from where the strip issues onto the surface of table 12 at a position intermediate the conveyors 10 and 11. In this manner, the strip 30 is delivered onto the table so that the sausage products are laid over it in a serial relation and at right angles to the strip as the lugs 13 deliver the product forwardly. A second strip of paper 33 is delivered over the sausage product from a supply disposed above the machine and as the sausages move forwardly with lugs 13, they engage and push before them the previously banded product whereby the strips 30 and 33 are pulled from their supply through guides 31 and 34 respectively. The strip 33 is fed through guide 34 to be disposed in a position in alignment with the first strip 30 disposed under the frankfurters.

After a frankfurter has been delivered to the position shown in Figure 4 and the banding strips 30 and 33 have been pulled forwardly from their supply, the arm 14 runs off of the cam strip and lug 13 falls back to lie flush with the endless belts 10 and 11 as shown in Figures 1 and 4. As soon as the lugs are retracted, the affixing means 40 is reciprocated to join the strips 30 and 33 together and as it drives downwardly, the strip 33 is drawn to the dotted line positions shown in Figure 4. The downward movement of the affixing means 40 is operative to draw the strip 33 from its supply and wrap it down tightly around the sausage product whereupon the strips 30 and 33 are then joined together.

As soon as the strips have been joined together, the affixing means 40 is retracted just as the next following sausage is being moved into position to be banded.

The affixing means 40 is mounted for reciprocating motion on a carriage 41 slidably mounted in the frame 42 of the machine. The carriage 41 has a rack 43 fixed thereto and a gear segment 44 is oscillated on axis 45 to reciprocate the rack 43 in timed relation to the movement of the pairs of lugs 13 on conveyors 10 and 11 so that the affixing means is moved downwardly immediately as the lugs 13 move to the position shown at the right hand side of Figure 4. The affixing means will preferably take the form of a heater to render tacky a thermoplastic adhesive coated on the band, and the heater is held down by its driving mechanism for a period long enough to transfer the required heat to the paper strips. When the affixing means 40 moves downwardly as has been explained the strips are joined and the affixing means is then retracted so that the succeeding sausage product may be delivered into position to be sealed.

The segment gear 44 is fixedly mounted on shaft 45 and shaft 45 is driven through cam arm 46 which cooperates with cam 47. The cam 47 is mounted upon the drive shaft 19 in order that the movement of conveyors 10 and 11 and the affixing means shall all be timed from a common drive.

In delivering the paper strips into the product banding position, it has been found preferable to provide a minimum of friction for strip 33 while strip 30 is retarded slightly. If any considerable pull is required to effect delivery of strip 33 from its supply source, it is possible that the strip may be too tightly pulled around the sausage product and an uneven application of the band to the product results. To overcome this possibility, slack producing means are associated with the supply means for strip 33 which slack producing means takes the form of a bell crank lever 50 pivotally mounted at 51 on the frame 42 of the machine. The bell crank lever 50 is driven from a cam 52 and the roller 53 carried on the lever, engages strip 33 to pull a supply from the roll. The motion of the bell crank lever is also timed from shaft 19 and it is rocked about its bearings 51 after the affixing means 40 has been driven into contact with the strips as shown in the dotted line position in Figure 4. The slack thus produced insures that the strip 33 will be free for application around the sausage product without undue back pull.

The strip 30 is pulled from below against the resistance offered by the unrolling of the supply roll and thus it is held taut to maintain it in a generally straight line. The slight resistance thus presented to the feeding of strip 30 coupled with the production of slack in the feeding of strip 33 insures that strip 30 will lay substantially in a plane while strip 33 is drawn around the product.

It has also been found desirable to place holding means in position to hold the frankfurter and strips 30 and 33 in proper assembled relation while the lug 13 is moving to its retracted position and before the affixing means 40 is driven to the position for joining the strips. This holding means may take the form of a star wheel 55 as best shown in Figure 4, the pockets of which have a curvature to engage over the strip 33 to press it down on the product and by pressing down on the sausage the strip 30 is also held in position so that the strips are maintained in alignment until they can be fixed together. The star wheel 55 is rotatably mounted and as the succeeding sausages are delivered into position at the working station of the machine, the previously banded sausage is forced under the star wheel and toward the outlet of the machine.

It has been found desirable to sometimes provide perforations across the area where the strips are joined together so that individual items of the banded sausage product may be easily separated and to accomplish this perforation, the nose of the affixing means 40 is provided with a recess 60 to receive a knife 61 fixedly mounted on a block 62 carried from the frame of the machine. The knife 61 may have a serrated upper end which serrated edge is normally disposed at a level just below the surface of table 12. The upper edge 63 of the knife 61 is normally enclosed in a slot 64 of the spring loaded plate 65. The upper surface of a plate 65 is situated below the nose of the affixing means 40 and when the affixing means 40 is moved to its lowermost position, the nose engages the spring loaded plate to press it downwardly against the springs while joining the strips together. The strips are carried downwardly before the nose of the affixing means and as the plate moves downwardly the serrated edge 63 of the fixedly mounted knife is projected through slot 64 and into the recess 60 in the nose of the affixing means whereby the strip is perforated. The plate 65 is normally urged upwardly by its spring loading means and as the affixing means 40 is retracted, the banded strips are lifted off of the serrated edge 63 of the knife.

In the operation of the above described machine, sausage products such as frankfurters are delivered into position at the working station of the machine by the pairs of lugs 13 as conveyors 10 and 11 continuously move forwardly. The motion of the infeeding frankfurter against the previously joined bands effects a delivery of the banding strip material. The frankfurters engaged before lugs 13 are carried forwardly with the conveyors and as soon as the rear edge of the frankfurter is disposed in substantially tangential relation with respect to the affixing means, the affixing means is reciprocated downwardly to join the strips 30 and 33 together. Simultaneously with the sealing of the strips, the strips are perforated laterally at a point intermediate the area of the seal whereby individual or groups of frankfurters may be easily separated from the continuous band package thus produced.

With this product feeding mechanism including conveyors 10 and 11 and lugs 13 it is apparent that regardless of variation in the size of the frankfurters, for example, the rear edge of the frankfurter to be banded is always disposed in proper relation with respect to the movement of the affixing means. This infeed mechanism thus automatically compensates for the variation in frankfurter size.

In the above described mechanism, the motion of the conveyor, the release of the lugs 13 so that they may move to their retracted position, and the motion of the affixing means 40 are all controlled from a common source of power and the fixed cam surface 15. Sealing of the strips takes place as soon as the product is delivered into proper position and the spacing between lugs 13 is just sufficient in proportion to the speed of the movement of the conveyor to permit sealing of the strips and retraction of the affixing means before delivery of the next succeeding product to the working station, and as soon as one sealing operation has been completed, a succeeding frankfurter or the like is being moved forwardly by conveyors 10 and 11 so that it is in position to move into the working station as the affixing means 40 is being retracted. The inward movement of the succeeding frankfurter causes the strip 33 to be looped over the infeeding frankfurter and this frankfurter then pushes the previously banded line of frankfurters toward the outlet of the machine. To aid in the removal of frankfurters, a continuously driven conveyor 70 may be disposed adjacent the outlet end of the machine to supply a drawing action or any other suitable means may be provided to prevent buckling of the previously banded frankfurters flowing from the outlet.

The strips 30 and 33 may take any desired form but in the preferred operation of the machine, for banding frankfurters, these banding strips are formed of paper with the necessary printing placed thereon and having a heat sealing adhesive coated on the side of each strip that is to be joined to the other strip. When using this type of banding strip, the affixing means 40 must have a heater associated therewith to render the thermoplastic adhesive tacky as above described. The heating means may be and preferably is provided with a nose for cooperating with the perforating means and the applied banding strips may thus be simultaneously heat sealed and perforated. It is suggested that other types of affixing means may also be adapted for use with this machine to join the strips, and different types of strips may be used advantageously with products other than frankfurters.

While the above described machine represents the preferred form of this invention, it is apparent that many equivalent mechanisms may occur to those skilled in the art. All such equivalent mechanisms are considered to fall within the scope of the following claims.

I claim:

1. A machine for assembling bands snugly on products such as frankfurters and the like and affixing them thereto comprising means to supply a strip of banding material into position to have products laid in serial relation over it, a moving endless belt feed means over which the products are laid, means to drive said belt means, said belt feed means having a plurality of lugs movably mounted thereon to engage the products adjacent the ends thereof to carry them with the belt means into said position, a fixed drag surface disposed between said lugs to contact the products laid on said feed means at a point intermediate the engagement thereof by said lugs, a cam track disposed adjacent to said endless belt means and cooperating with the movable lugs to control the movement of said lugs whereby they are moved into disengaging position with respect to said products just as said products are delivered into said position, means to supply a second strip of banding material over the products, and means to affix said one strip to the other intermediate each of said serially arranged products, the movement of said affixing means being timed with respect to the movement of said lugs so that the affixing means is operable to affix said strips together immediately after said lugs are disengaged from the products.

2. A machine for assembling bands snugly on elongated products such as frankfurters and the like and affixing them thereto comprising means to supply a strip of banding material into position to have products laid in serial relation over it, a pair of spaced endless belts upon which the products are laid, said belts being spaced apart a distance such as to engage the products at their ends, said strip being supplied so as to flow through the machine from a point intermediate said spaced belts past said position, means to drive said belts, each of said belts having a plurality of lugs movably mounted thereon, the lugs on one belt being disposed oppositely to the lugs on the other belt whereby a pair of lugs is adapted to engage the products to carry them with the belts into said position, a fixed drag surface disposed between said lugs to contact the products laid on said feed means at a point intermediate the engagement thereof by said lugs, a cam track disposed adjacent to each of said belts and cooperating with the movable lugs to control the movement of said lugs whereby they are moved into disengaging position with respect to said products just as said products are delivered into said position, means to supply a second strip of banding material over the products, and means to affix said one strip to the other intermediate each of said serially arranged products, the movement of said affixing means being timed with respect to the movement of said lugs so that the affixing means is operable to affix said strips together immediately after said lugs are disengaged from the products.

JAMES J. PROHASKA.

REFERENCES CITED

The following references are of record in the file of this patent:

UNITED STATES PATENTS

| Number | Name | Date |
|---|---|---|
| 485,547 | Kastenhuber et al. | Nov. 1, 1892 |
| 1,181,607 | Mitchell | May 2, 1916 |
| 2,095,139 | Kind | Oct. 5, 1937 |
| 2,336,962 | Salfisberg | Dec. 14, 1943 |
| 2,418,054 | Sloan et al. | Mar. 25, 1947 |

FOREIGN PATENTS

| Number | Country | Date |
|---|---|---|
| 262,588 | Great Britain | Dec. 16, 1926 |
| 362,354 | Germany | Oct. 27, 1922 |
| 713,593 | France | Oct. 29, 1931 |
| 782,618 | France | Mar. 18, 1935 |